(12) United States Patent
Zerbe et al.

(10) Patent No.: US 8,667,347 B2
(45) Date of Patent: Mar. 4, 2014

(54) ACTIVE CALIBRATION FOR HIGH-SPEED MEMORY DEVICES

(75) Inventors: Jared L. Zerbe, Woodside, CA (US); Frederick A. Ware, Los Altos Hills, CA (US); Brian S. Leibowitz, San Francisco, CA (US)

(73) Assignee: Rambus Inc., Sunnyvale, CA (US)

( * ) Notice: Subject to any disclaimer, the term of this patent is extended or adjusted under 35 U.S.C. 154(b) by 214 days.

(21) Appl. No.: 13/130,515

(22) PCT Filed: Dec. 29, 2009

(86) PCT No.: PCT/US2009/069759
§ 371 (c)(1),
(2), (4) Date: May 20, 2011

(87) PCT Pub. No.: WO2010/078383
PCT Pub. Date: Jul. 8, 2010

(65) Prior Publication Data
US 2011/0239063 A1 Sep. 29, 2011

Related U.S. Application Data

(60) Provisional application No. 61/142,005, filed on Dec. 31, 2008.

(51) Int. Cl.
*G11C 29/00* (2006.01)
(52) U.S. Cl.
USPC .......................................................... 714/719
(58) Field of Classification Search
USPC .................. 714/719, 799; 711/167
See application file for complete search history.

(56) References Cited

U.S. PATENT DOCUMENTS

| 4,011,587 | A | * | 3/1977 | Arter et al. ..................... 360/62 |
|---|---|---|---|---|
| 6,088,774 | A | | 7/2000 | Gillingham |
| 6,643,787 | B1 | | 11/2003 | Zerbe |
| 7,095,789 | B2 | | 8/2006 | Ware |
| 7,210,016 | B2 | * | 4/2007 | Ware et al. ..................... 711/167 |
| 7,225,311 | B2 | * | 5/2007 | Ware et al. ..................... 711/167 |
| 7,360,127 | B2 | | 4/2008 | Zerbe |
| 8,264,906 | B2 | * | 9/2012 | Chiu ........................ 365/233.11 |
| 8,352,696 | B2 | * | 1/2013 | Hampel ........................ 711/167 |
| 8,407,441 | B2 | * | 3/2013 | Giovannini et al. .......... 711/167 |
| 2005/0071707 | A1 | | 3/2005 | Hampel |
| 2005/0132158 | A1 | * | 6/2005 | Hampel et al. ................ 711/167 |
| 2005/0210215 | A1 | | 9/2005 | Sezaki |
| 2013/0034134 | A1 | * | 2/2013 | Chiu ............................ 375/219 |

FOREIGN PATENT DOCUMENTS

| WO | 2005072355 | A2 | 8/2005 |
|---|---|---|---|
| WO | 2008063199 | A1 | 5/2008 |

* cited by examiner

*Primary Examiner* — Phung M Chung
(74) *Attorney, Agent, or Firm* — Mahamedi Paradice Kreisman LLP

(57) ABSTRACT

A system for calibrating timing for write operations between a memory controller and a memory device. During operation, the system identifies a time gap required to transition from writing data from the memory controller to the memory device to reading data from the memory device to the memory controller. The system then transmits a test data pattern to the memory device within the time gap. The system subsequently uses the received test data pattern to calibrate a phase relationship between a received timing signal and data transmitted from the memory controller to the memory device during write operations.

18 Claims, 13 Drawing Sheets

ACTIVE CALIBRATION FOR HIGH-SPEED MEMORY DEVICES

TECHNICAL FIELD

The present embodiments generally relate to techniques for communicating data between a memory controller and a memory device. More specifically, the present embodiments relate to a method and system for actively tracking and calibrating phase and other signal conditioning in the communication path between a memory controller and a memory device.

DETAILED DESCRIPTION

Figure 1A:
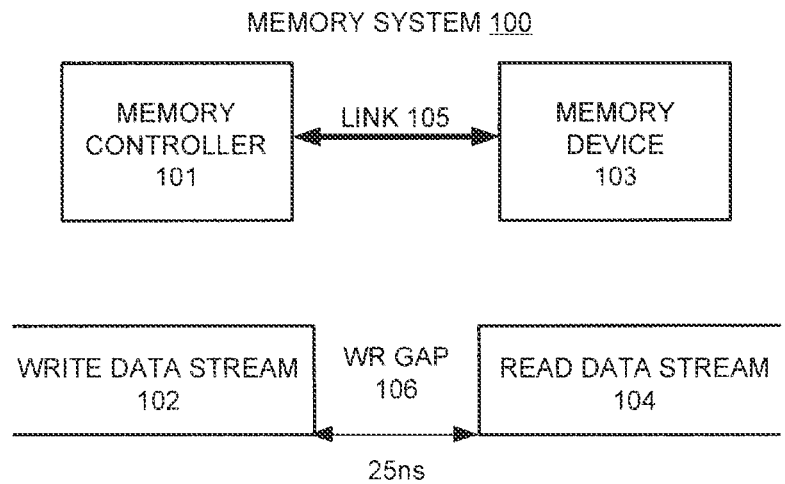
FIG. 1A illustrates an exemplary data timing diagram for a write-to-read transition during memory operations between a memory controller and a memory device.

During memory operations between a memory controller and a memory device, a write-to-read timing gap between a write operation and an immediately following read operation can occur on the data link between the memory controller and the memory device. This timing gap occurs as a result of contention for shared communication pathways within the memory device. More specifically, FIG. 1A illustrates an exemplary data timing diagram for a write-to-read transition during memory operations within a memory system 100. Note that memory system 100 includes a memory controller 101 which is coupled to a memory device 103 via link 105.

As seen in the timing diagram, a write data stream 102 precedes a WR gap 106 which, in turn, precedes a read data stream 104. Note that between the end of the write data stream 102 and the beginning of the read data stream 104, a 25 ns WR gap 106 is created by resource conflicts in the memory device. More specifically, bidirectional column I/O wires within the memory core interface are shared by both the write and read data pipelines. Hence, when a write operation is immediately followed by a read operation, the column I/O wires need to be cleared before receiving read data. This causes a small time gap between the write and read operations on the column I/O wires. This small time gap subsequently causes a corresponding larger time gap between a write data block and a subsequent read data block on the data link due to the inbound and outbound nature of the data on the memory device. Note that other resource conflicts which arise during a write-to-read turnaround can also contribute to the time gap on the data link. WR gaps are generally viewed as undesirable idle time slots and effect the overall efficiency of the memory system.

Embodiments presented in this disclosure provide techniques that utilize these idle time slots to perform phase tracking and associated calibration operations. More specifically, the WR gap can be used to communicate phase calibration data (e.g., a test data pattern) and phase error information back and forth between memory controller 101 and memory device 103. This allows the memory controller to maintain a correct phase relationship between the write data and the reference timing signal by updating the phase relationship during every WR gap. Note that this technique for phase calibration does not interrupt normal memory operations.

Figure 1B:
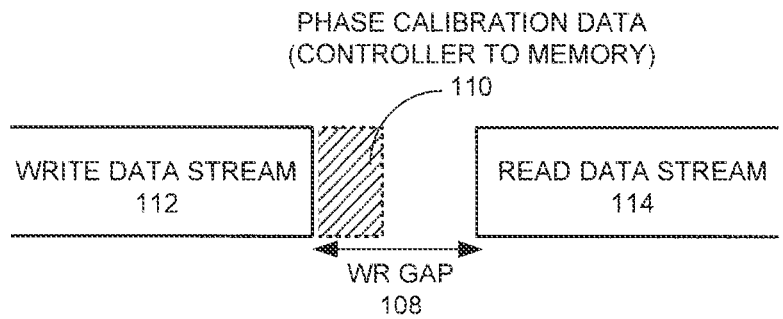
FIG. 1B illustrates a write-to-read timing gap (WR gap) which is used to send phase calibration data from a memory controller to a memory device over an idle data link.

For example, FIG. 1B illustrates the process of using a WR gap 108 to send phase calibration data 110, such as a test pattern, from memory controller 101 to memory device 103 over link 105. In some embodiments, phase calibration data 110 can be transmitted immediately after the end of write data stream 112 (i.e., without a gap between the two). Calibration data can be transmitted during the gap because it is never passed through all or some of the shared read/write resources that are responsible for the gap requirement (e.g., the column I/O wires discussed earlier). However, at least some gap is typically still required between phase calibration data 110 and read data stream 114 to allow time for the data driver on memory controller 101 to become disabled and the data driver on memory device 103 to become enabled (this time gap can be about 7.5 ns in some systems).

In some embodiments, a time gap may be required between phase calibration data 110 and write data stream 112. This is because these two types of information in some embodiments are transmitted with a relative phase offset of ½ UI (i.e., half a bit time), and this time gap may be needed to allow the phase adjustment circuitry in memory controller 101 to stabilize. Note that this time gap can be on the order of 1-10 ns, and may simply be a time during which a constant voltage level can be established on link 105 by memory controller 101 (i.e., the transmitter).

Figure 1C:
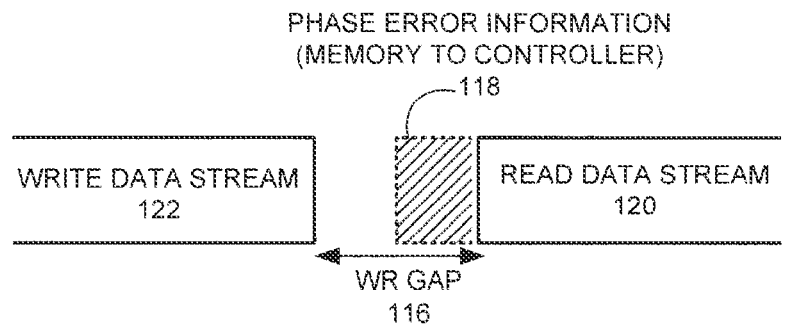
FIG. 1C illustrates using a WR gap to send phase error information from the memory device to the memory controller over an idle data link.

After receiving phase calibration data 110 on memory device 103 to generate the phase error information, the phase error information can be sent back to memory controller 101 for phase correction in the controller. For example, FIG. 1C illustrates using a subsequent WR gap 116 to send phase error information 118 from memory device 103 to memory controller 101 over link 105. Note that WR gap 116 which is used to send phase error information 118 can be the same gap as WR gap 108 which is used to send phase calibration data 110. Alternatively, WR gap 116 can be a subsequent WR gap which follows WR gap 108. Furthermore, it is worth noting that in one embodiment phase error information 118 contains two components: (1) phase update data from the writes to the memory device, and (2) read phase information inherent in the reception of phase error data by the controller.

In some embodiments, phase error information 118 can be transmitted such that the end of phase error information 118 is pushed up against the beginning of read data stream 120. However, a minimum time gap is typically required between phase error information 118 and write data stream 122 to allow time for the data driver on memory device 103 to become disabled and the data driver on memory controller 101 to become enabled (this time gap can be about 7.5 ns in some existing systems).

Figure 2:
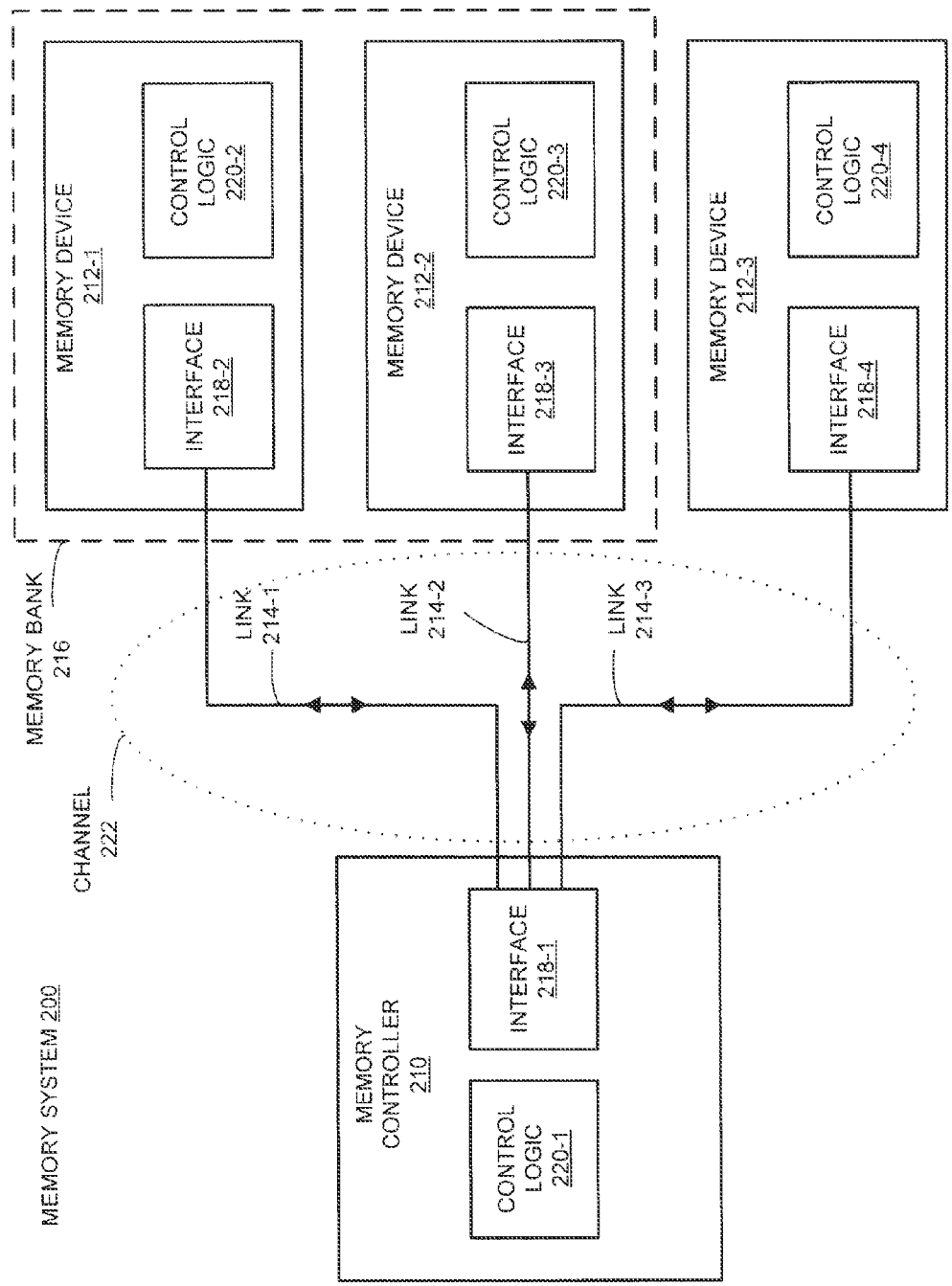
FIG. 2 presents a block diagram illustrating an embodiment of a memory system, which includes at least one memory controller and one or more memory devices.

We now describe embodiments of the above-mentioned technique in the context of a more detailed version of a memory system 200 which appears in FIG. 2. More specifically, FIG. 2 presents a block diagram illustrating an embodiment of a memory system 200, which includes at least one memory controller 210 and one or more memory devices 212. While FIG. 2 illustrates memory system 200 with one memory controller 210 and three memory devices 212, other embodiments may have additional memory controllers and fewer or more memory devices 212. Moreover, while memory system 200 illustrates memory controller 210 coupled to multiple memory devices 212, in other embodiments two or more memory controllers may be coupled to each other. Note that memory controller 210 and the one or more memory devices 212 may be implemented on the same or different integrated circuits, and that the one or more integrated circuits may be included in a single chip package.

Memory controller 210 may include an I/O interface 218-1 and control logic 220-1. As will be discussed below in FIGS. 3, 4, and 6A-6C, control logic 220-1 may be used to calibrate the phase relationship between data signals and associated timing signals transmitted between memory controller 210 and three memory devices 212.

In some embodiments, one or more of memory devices 212 include control logic 220 and at least one of interfaces 218. However, in some embodiments some of the memory devices 212 may not have control logic 220. Moreover, memory controller 210 and one or more of memory devices 212 may include more than one of the interfaces 218, and these interfaces may share one or more control logic 220 circuits. Note that in some embodiments two or more of the memory devices 212, such as memory devices 212-1 and 212-2, may be configured as a memory bank 216.

Memory controller 210 and memory devices 212 are coupled by one or more links 214, such as multiple wires, in a channel 222. While memory system 200 is illustrated as having three links 214, other embodiments may have fewer or more links. Moreover, these links may provide wired, wireless and/or optical communication. Furthermore, links 214 may be used for bidirectional and/or unidirectional communication between the memory controller 210 and one or more of the memory devices 212. For example, bidirectional communication between the memory controller 210 and a given memory device may be simultaneous (full-duplex communication). Alternatively, the memory controller 210 may transmit information (such as a data packet which includes a command) to the given memory device, and the given memory device may subsequently provide the requested data to the memory controller 210. In yet another alternative, some links may be dedicated for communication from the controller to the memory, and other links for communication from the memory to the controller. Note that one or more of the links 214 and corresponding transmit circuits and/or receive circuits may be dynamically configured for bidirectional and/or unidirectional communication.

Signals corresponding to data and/or commands (such as request-for-data commands) may be communicated on one or more of the links 214 using either or both rising and falling edges in one or more timing signals. These timing signals may be generated based on one or more clock signals, which may be generated on-chip (for example, using a phase-locked loop and one or more reference signals provided by a frequency reference) or off-chip. In some embodiments, operations involved in transmitting and receiving these signals may be synchronous or asynchronous.

Figure 3:
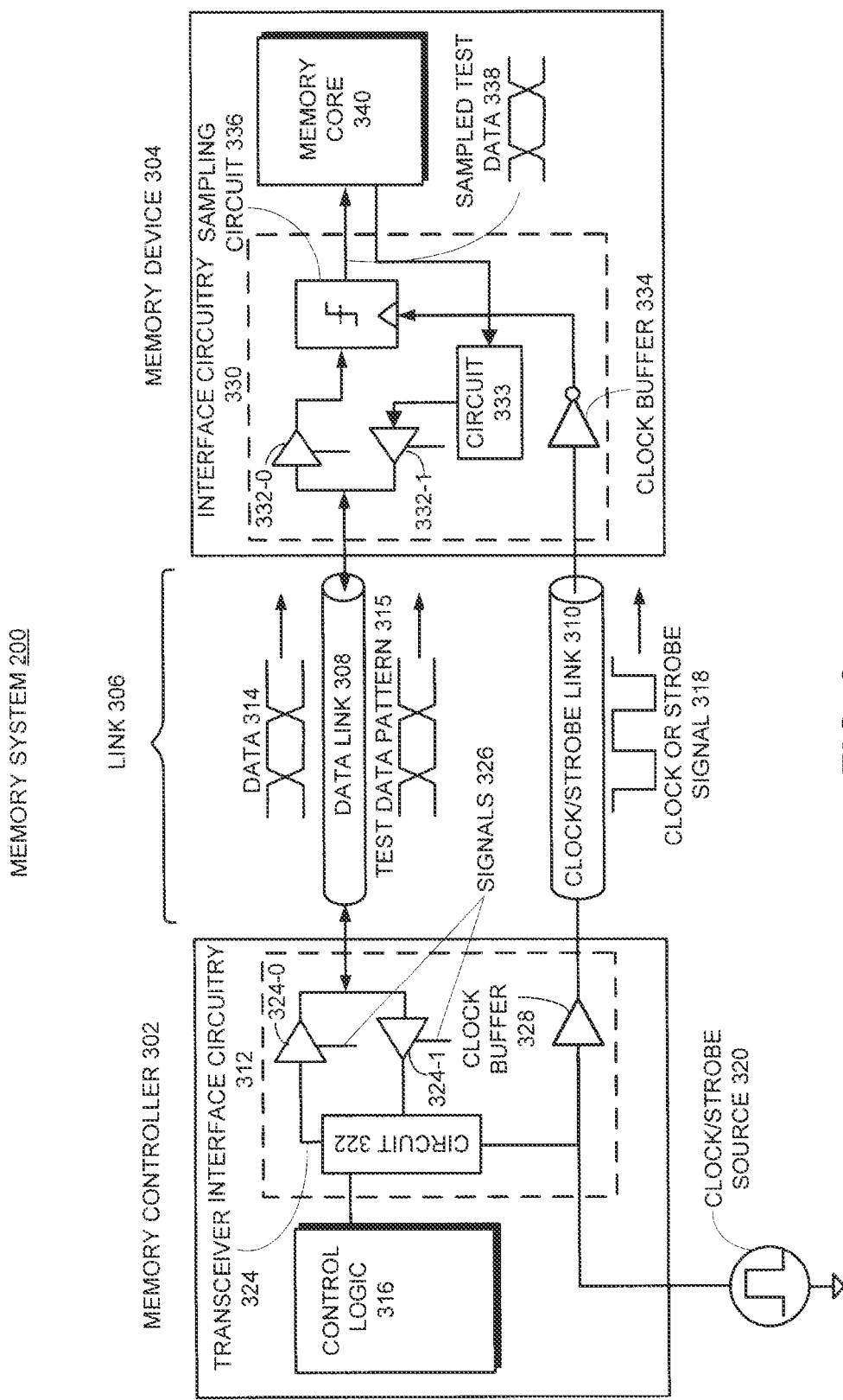
FIG. 3 presents a block diagram illustrating an embodiment of memory system 200.

Exemplary circuitry for calibrating the phase relationship between write data and an associated timing signal within a memory system is illustrated in FIG. 3. More specifically, FIG. 3 presents a block diagram illustrating an embodiment of memory system 200. As illustrated in FIG. 3, memory system 200 includes a memory controller 302 and a memory device 304, which communicate through a link 306. Note that link 306 can include a bidirectional data link 308 for communicating both write and read data, and a clock or strobe link 310 for transmitting reference timing information. In some embodiments, these links are matched so that the delay for write data on data link 308 is substantially the same as the delay for the clock or strobe signal on clock or strobe link 310. Alternately, in some embodiments at some times the phase relationship between data link 308 and clock or strobe link 310 is substantially close to ½ UI, the clock or strobe 310 transition is centered in the valid data region of data 314.

Memory controller 302 includes interface circuitry 312 which is coupled to link 306. During a write operation, interface circuitry 312 receives write data 314 ("data 314" hereafter) from control logic 316 and a clock or strobe signal 318 from an internal or external clock or strobe source 320. In this embodiment, interface circuitry 312 additionally includes a synchronization circuit 322 (e.g., flip-flops), which synchronizes clock or strobe signal 318 and data 314. In one embodiment, synchronization circuit 322 aligns the edges of clock or strobe signal 318 with the center of a data eye for data 314. In some embodiments, synchronization circuit 322 aligns the edges of clock or strobe signal 318 with data 314 according to a predetermined phase relationship provided by control logic 316. In these embodiments the alignment of clock and data allows for the use of the sampling circuit 336 to function as a phase-detector comparing the relative phase of clock or strobe signal 318 and data 314 or test data pattern 315. The output of sampling circuit 336 can then be accumulated for phase correction by means of a sub-UI adjustment to synchronization circuit 322.

Interface circuitry 312 additionally includes a transceiver 324 which facilitates both transmitting and receiving data. Note that transceiver 324 includes a transmitter 324-0 for sending write data during write operations, and receiver 324-1 for receiving read data during read operations. Note that transmitter 324-0 and receiver 324-1 can be selectively activated by control signals 326. Hence, during a write operation, transmitter 324-0 is activated while receiver 324-1 is deactivated. Note that interface circuitry 312 also includes a unidirectional clock buffer 328 for sending reference clock or strobe signal 318 onto clock or strobe link 310 during write operations.

Note that data link 308 is a bidirectional link which allows data to flow in opposite directions during respective write and read operations. In some embodiments, data link 308 and clock or strobe link 310 are matched so that the delays over data link 308 and clock or strobe link 310 are substantially the same. Note that during write operations, clock or strobe signal 318 is transmitted in the same direction as data 314 over link 306 to provide a timing reference for data recovery when data 314 is received at memory device 304. In some embodiments, data 314 and clock or strobe signal 318 are source-synchronous signals that are generated by the same source device, which can be either the memory controller or the memory device. Alternatively, instead of using source-synchronous signaling, the memory controller and each memory device could have a PLL or a DDL and could receive a common reference clock signal.

Memory device 304 includes interface circuitry 330 coupled to link 306 for receiving data 314 and clock or strobe signal 318 from memory controller 302. Note that interface circuitry 330 includes a transceiver 332 for receiving data 314, and a clock buffer 334 for receiving clock or strobe signal 318. More specifically, during a write operation, receiver 332-0 in transceiver 332 is activated while transmitter 332-1 in transceiver 332 is deactivated, whereas during a read operation, transmitter 332-1 is activated while receiver 332-0 is deactivated. Interface circuitry 330 also includes a data-sampling circuit 336 ("sampling circuit 336" hereafter), which performs data sampling on received test data pattern 315 under control of received clock or strobe signal 318 to produce sampled test data 338. Sampling circuit 336 is also used to perform data sampling on write data 314 under control of received clock or strobe signal 318 to produce write data to the memory core 340. In some embodiments, sampled test data 338 can be stored into memory core 340. Interface circuitry 330 also includes a synchronization circuit 333, such as a flip-flop, which is used to synchronize the transmission of read data during read operations.

Note that due to voltage, temperature, and other variations, the phase relationship between received data 314 and clock or strobe signal 318 may change over time from its original alignment when it was calibrated at an earlier time at a different voltage and temperature. Hence, it is desirable to track the phase error between received data 314 and clock or strobe signal 318 without interrupting normal memory operations.

In some embodiments, the system uses the aforementioned WR gaps on link 306 to track and calibrate the phase relationship between the received data 314 and the clock or strobe signal 318. Because no actual critical write or read data is transmitted on link 306 during these WR gaps, the proposed phase tracking and calibration operations do not interfere with normal memory operations.

More specifically, during a WR gap, test data pattern 315 is transmitted within the WR gap from interface circuitry 312 on memory controller 302 through data link 308, and is received at interface circuitry 330 within memory device 304, wherein test data pattern 315 is in some embodiments offset by approximately one-half of a bit time with respect to regular write data which is sampled by sampling circuit 336 in the center of the data eye. (Note that the terms "bit time" and "symbol time" are used interchangeably throughout this specification and the appended claims.) At the same time, the clock or strobe signal 318 is transmitted by interface circuitry 312 through clock or strobe link 310, and is also received by memory device 304. In other embodiments, the test data pattern 315 is transmitted with the same phase alignment as write data 314, but the clock or strobe signal 318 is offset by ½ UI during transmission of test data pattern 315. In some embodiments, instead of an offset of one half-bit time at memory controller 302, a second 'edge' sampler is used at memory device 304 to determine phase information.

Figure 4:
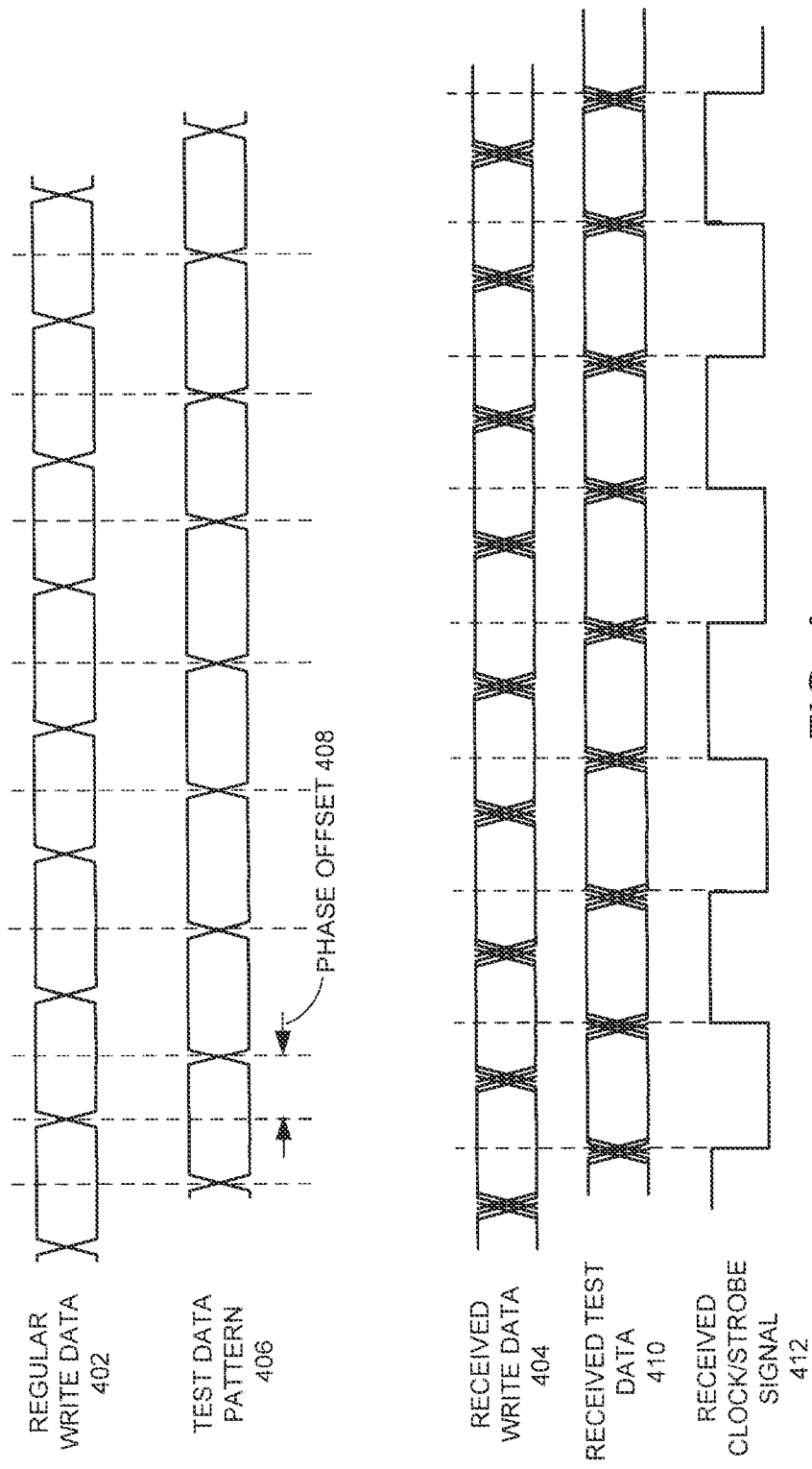
FIG. 4 presents an exemplary timing diagram illustrating the phase relationship between the regular write data of a standard write operation, a test data pattern and a reference clock signal.

FIG. 4 presents an exemplary timing diagram illustrating the phase relationship between normal write data of a standard write operation, a test data pattern and a reference clock or strobe signal. The regular write data pattern 402 contains 8 data bits and is phase-aligned such that it detected by the memory device as received write data 404 with the center of each data bit approximately aligned to the edges of the received clock or strobe signal 412 (both rising and falling edges as in a double data rate (DDR) clocking mode), thereby sampling the regular write data in the center of the data eye on the memory device. In contrast, while a portion or all of test data pattern 406 is being received, test data pattern 406 is offset relative to regular write data 402 by approximately one-half of a bit time, denoted as phase offset 408. Received test data 410 is consequently also shifted by approximately ½ UI from received write data 404. Due to the insertion of approximately ½ UI phase offset between test data pattern 406 and reference clock or strobe signal 404, the edges of received clock or strobe signal 412 are now located in the vicinity of the transition regions of the received test data pattern 410. In this way, the memory controller sends the data shifted and unshifted, thereby allowing a single sampler in the memory device to receive both data and associated edge samples. Consequently, phase errors which may have accumulated between the data and the timing reference signal used to sample the data will show up as a statistically significant number of 'early' or 'late' samples in the received test data sampling, similar to what happens in a bang-bang phase detector. That is, the sampler may on average tend to sample the received test data just before the received transitions, or just after the received transitions. In one embodiment, test data pattern 406 and phase offset 408 may be generated by control logic 316 on memory controller 302, and the phase offset may control a delay element in synchronization circuit 322.

Referring to FIG. 3, received test data pattern 315 is then sampled by sampling circuit 336 to produce sampled test data pattern 338, wherein the timing control for sampling circuit 336 is provided by the received reference clock or strobe signal 318. Next, sampled test data pattern 338 can be compared with the original test data pattern 315 to determine whether more data samples occurred before or after the respective transition times in test data pattern 315.

In some embodiments, the comparison between the sampled test data pattern and the original test data pattern can be performed on memory device 304. Note that these embodiments require the memory device to have a copy of the original test data pattern or a duplicate version of the logic used to create the test data pattern.

In some embodiments the test data is simply a copy of the last portion of the actual write data pattern sent from the memory controller to the memory device, but phase-shifted by ½ UI. In this way, the memory device need only store the last portion of the actual data and make the appropriate phase-detector style comparison between the actual data and the second-transmission with ½ UI shift and no pattern generators are required.

In some embodiments the test pattern can be divided into two portions: a phase-shifted section and a non-phase-shifted section. In these embodiments the memory device can thus store the test data pattern using a reasonably low-cost storage mechanism such as a register and perform a comparison or average a set of comparisons to provide the early/late phase information.

In other embodiments, this comparison is performed on memory controller 302. Note that these other embodiments require that the sampled test data pattern be sent back to memory controller 302.

In some embodiments, the sampled test data pattern is transmitted from memory device 304 to memory controller 302 within the same WR gap that was used to transmit the test data pattern. These embodiments facilitate maximizing utilization of each WR gap.

In yet other embodiments, the sampled test data pattern may be transmitted from memory device 304 to memory controller 302 within a subsequent WR gap which follows the gap used to transmit the test data pattern, or within an even later WR gap. These embodiments allow accumulation of statistics over more than one test data pattern.

In still other embodiments, both data and edge samplers are present on memory device 304, and memory controller 302 transmits the data without a ½ UI shift. In these embodiments memory device 304 can itself determine, using a comparison technique of incoming 'data' vs. 'edge' samples, whether the phase placement is early or late for each sample. Note that different techniques for computing early/late decisions from the sampled test data pattern are described below in conjunction with FIGS. 6A-6C.

Next, based on the sampled test data pattern, a phase error (or the polarity of a phase error) between the write data and the reference clock or strobe signal can be determined. Note that conventional techniques can be used to determine the phase error based on the sampling errors. This obtained phase error is then used to update the phase relationship between regular write data 314 and the reference clock or strobe signal 318. Note that this phase update using the phase error is typically performed by control logic 316 on memory controller 302.

Figure 5:
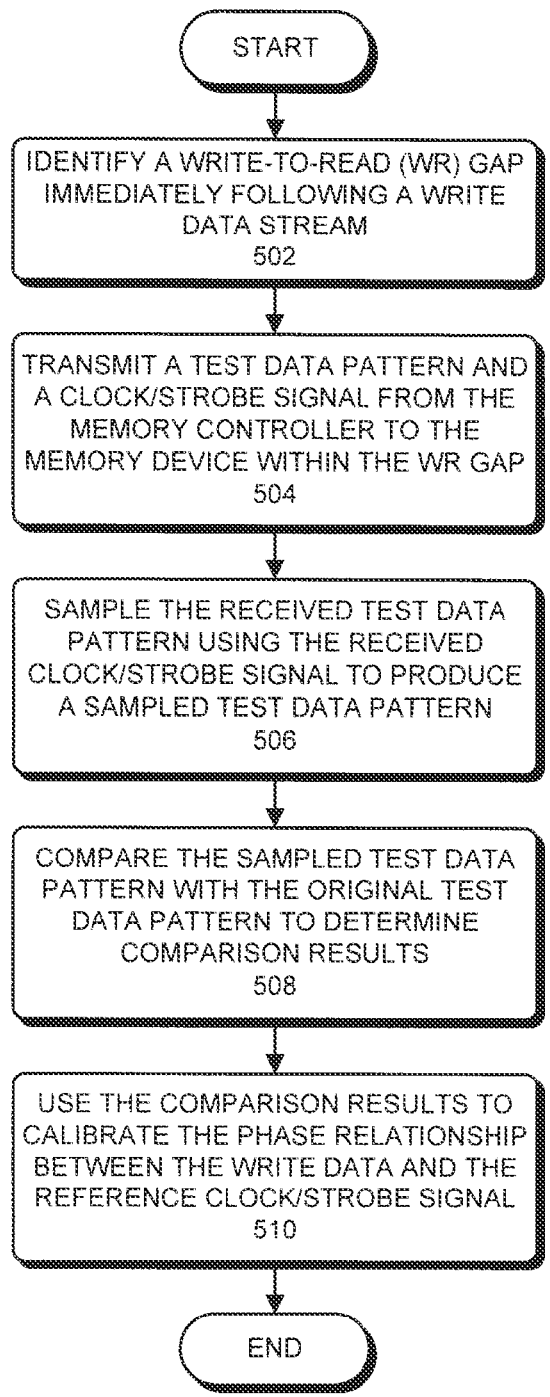
FIG. 5 presents a flowchart illustrating a process for tracking and calibrating a phase relationship between the received data and a timing reference signal (such as a clock signal) in a memory system in some embodiments.

FIG. 5 presents a flowchart illustrating a process for tracking and calibrating a phase relationship between the received data and a timing reference signal (such as a clock signal) in a memory system.

During operation, the system identifies a WR gap immediately following receipt of write data (a write operation) and before a subsequent transmission of read data (a read operation) (step 502). Note that these WR gaps can be identified based on a received memory command sequence by the memory controller.

Next, the system transmits a test data pattern and a reference clock or strobe signal from the memory controller to the memory device within the WR gap (step 504). In some embodiments, the test data pattern is offset by approximately one-half of a bit time with respect to regular write data which is sampled in the center of the data eye. In one embodiment, the test data pattern contains 16 data bits. Other embodiments can contain fewer or more data bits.

After receiving the test data pattern and the reference clock or strobe signal at the memory device, the system samples the received test data pattern using the received reference clock or strobe signal to produce a sampled version of the test data pattern (step 506). The system next compares the sampled test data pattern with the original test data pattern to produce comparison results (step 508). Different techniques for computing comparison results for the sampled test data pattern are described below in conjunction with FIGS. 6A-6C.

Next, based on the comparison results the system determines a phase error between the write data and the reference clock, and uses this phase error to update the phase relationship between the write data and the reference clock or strobe signal (step 510). Overall, running this loop provides a means whereby the phase relationship between write data and the reference clock or strobe will be calibrated and maintain calibration through system variations such as voltage or temperature variations.

Figure 6A:
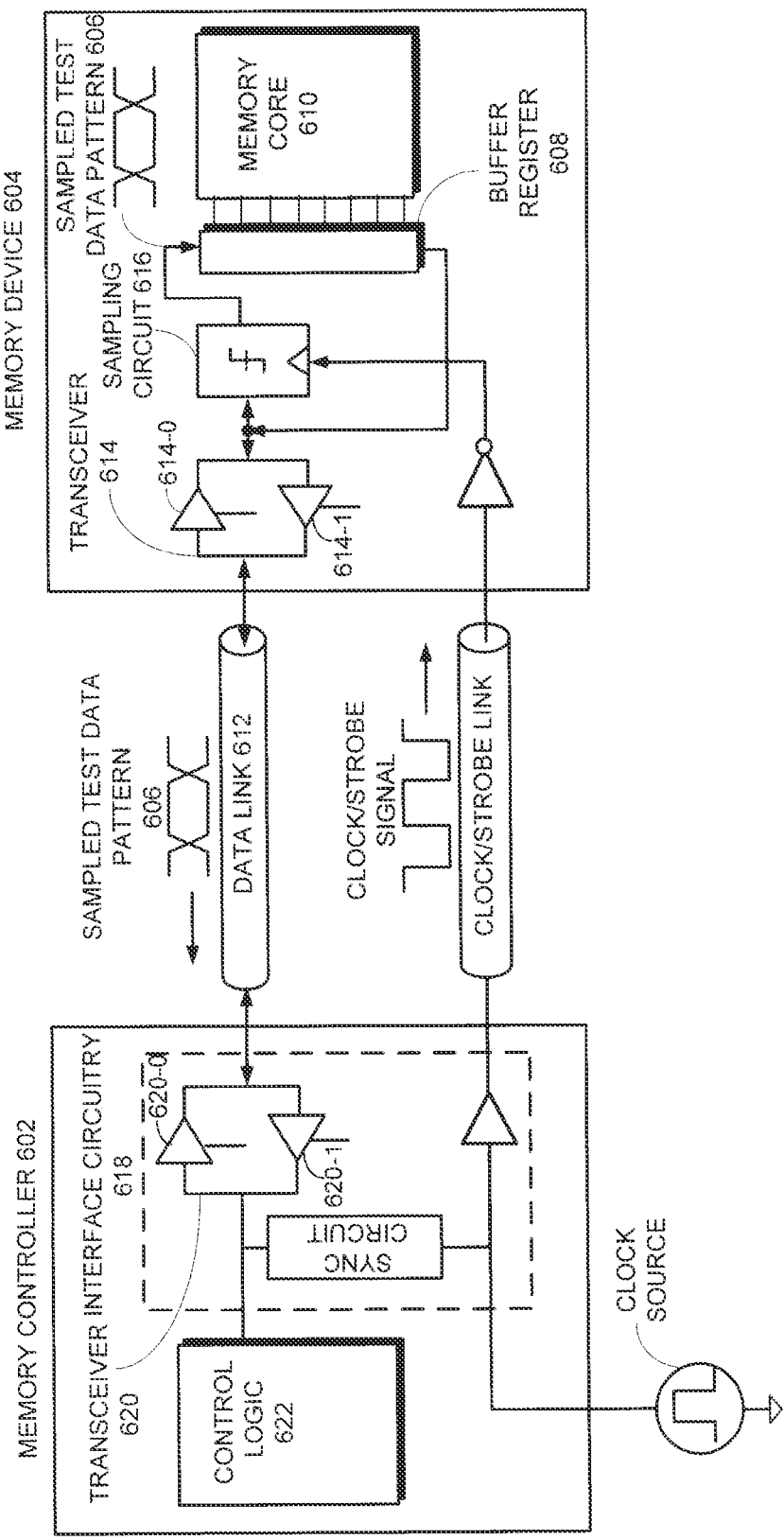
FIG. 6A presents a block diagram illustrating a memory device configured to send the sampled test data pattern back to a memory controller where the sampling errors rate is computed.
Figure 6B:
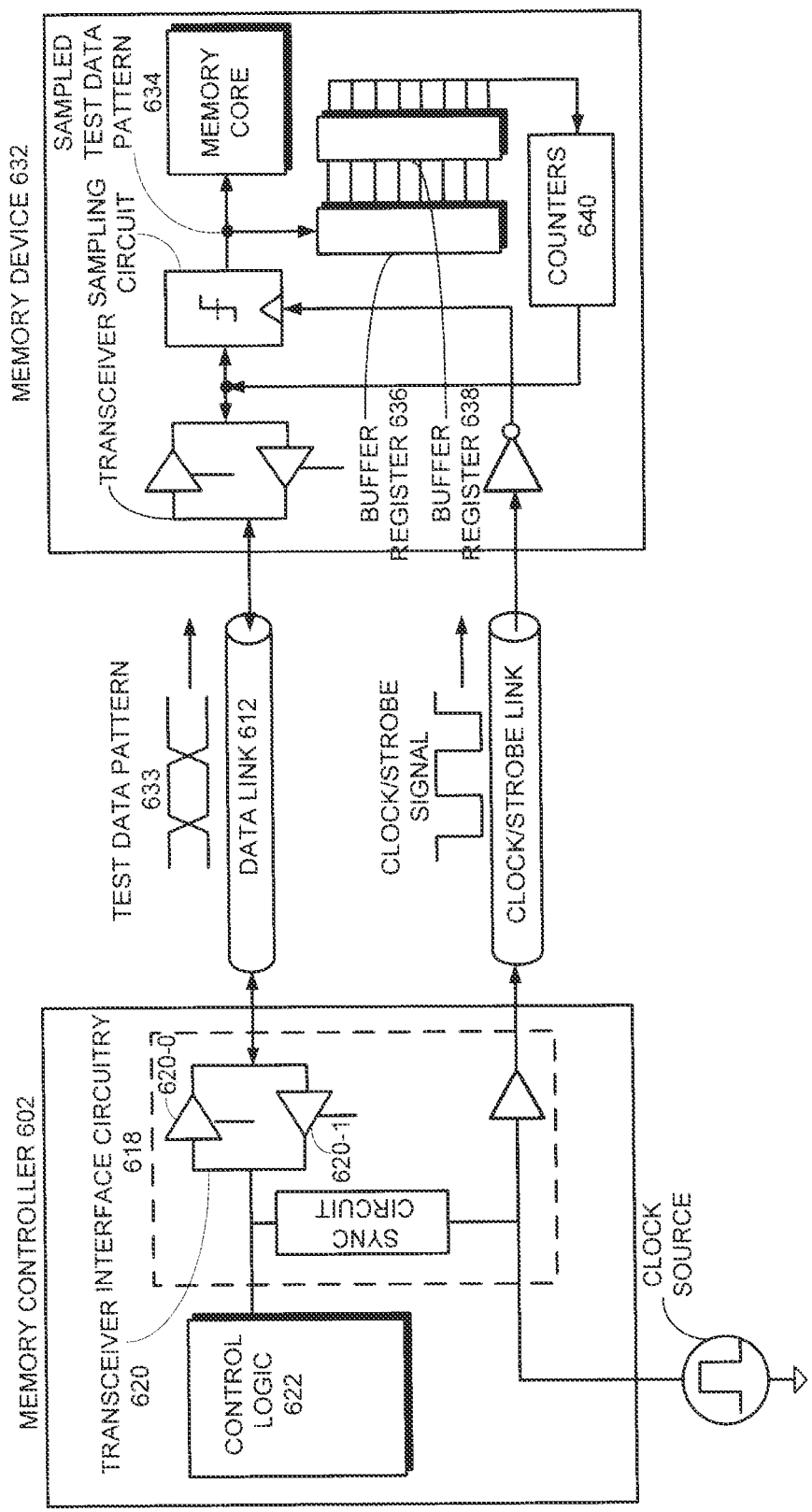
FIG. 6B illustrates a variation of the embodiment in FIG. 6A, wherein sampling phase errors in the sampled test data pattern are directly computed on the memory device.
Figure 6C:
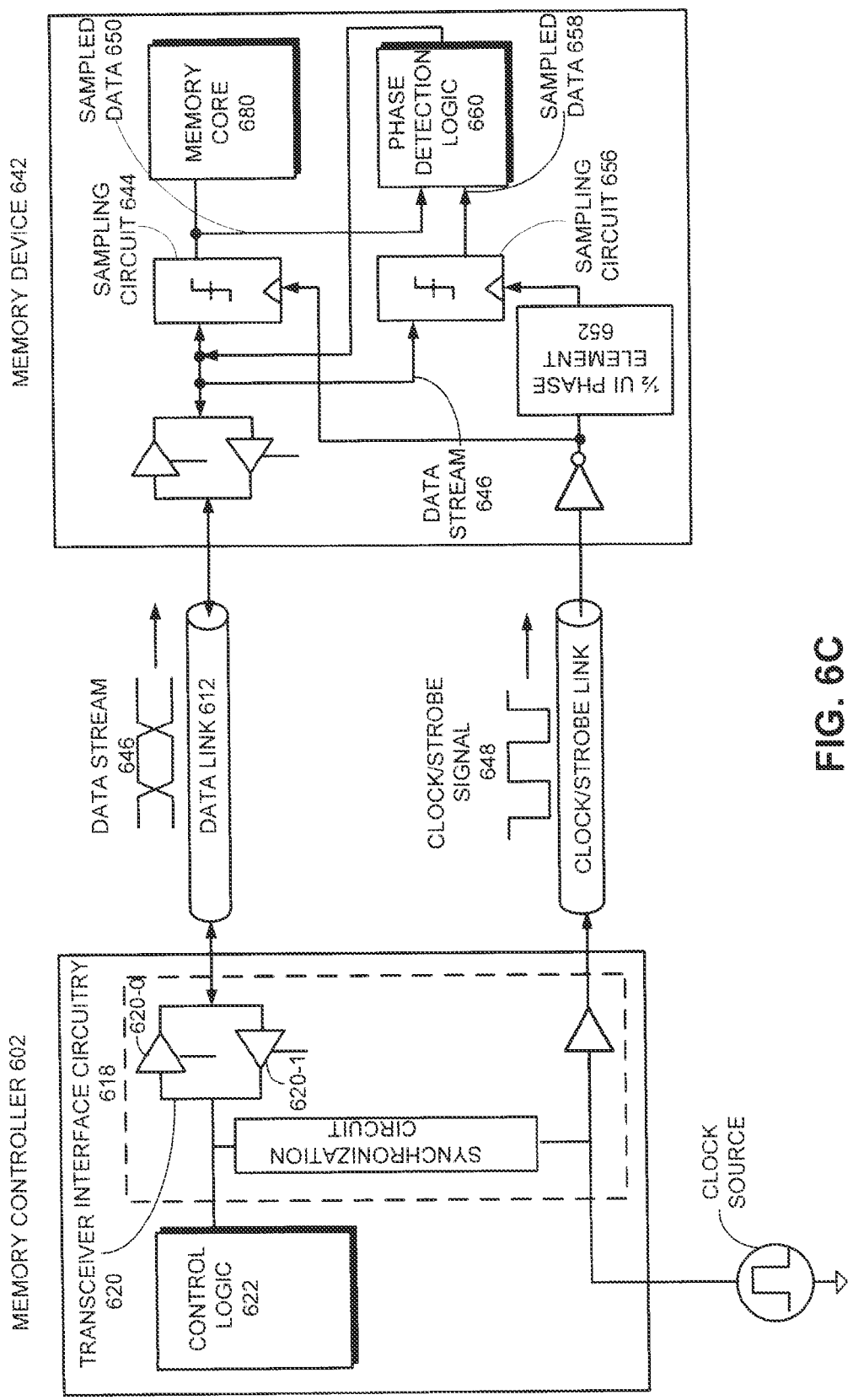
FIG. 6C illustrates an embodiment which enables continuous phase tracking using regular write data without having to use test data patterns.

FIGS. 6A-6C illustrate embodiments that generate comparison results for the sampled test data pattern. More specifically, these embodiments are identical to each other up to the point that the test data pattern and the reference clock or strobe signal have been received at the memory device during the write-to-read transition. Also note that FIGS. 6A-6C illustrate memory system embodiments which are substantially based on memory system 200 in FIG. 3, but differ in the memory device implementations. The ways in which these embodiments differ are described below.

FIG. 6A presents a block diagram illustrating a memory device 604 configured to send the sampled test data pattern back to memory controller 602 where the sampling data is converted into phase information. As illustrated in FIG. 6A, sampled test data pattern 606 is buffered in a buffer register 608. In this embodiment, memory device 604 uses a native deserializing buffer, which is normally used to convert a serial write data stream into parallel data which feeds into memory core 610. Moreover, in this embodiment, it is assumed that the deserializing buffer is idle because no other memory write operation is taking place on memory core 610. In other embodiments, memory device 604 can use another buffer register within memory device 604 in place of the deserializing buffer, if such a buffer register is available.

Note that to send the sampled test data pattern back to memory controller 602, a serial output port of buffer register 608 is coupled to bidirectional data link 612 through a transceiver 614. More specifically, transceiver 614 includes a receiver 614-0 and a transmitter 614-1, wherein the serial output of buffer register 608 is coupled to the input of transmitter 614-1. Hence, buffer register 608, transmitter 614-1, and data link 612 form a loopback circuitry for returning sampled test data pattern 606 to memory controller 602. When the entire sampled test data pattern 606 has been buffered in buffer register 608, receiver 614-0 may be disabled and transmitter 614-1 enabled. In some embodiments, if the WR gap which is used to receive the current test data pattern is still available, memory device 604 can enable buffer register 608 to send the sampled test data pattern 606 back to memory controller 602 within the remaining time in the same WR gap. In other embodiments, memory device 604 can have buffer register 608 hold the sampled data and can enable buffer register 608 to send the sampled test data pattern 606 back to memory controller 602 during a subsequent WR gap.

In some embodiments, memory device 604 can receive multiple copies of a same test data pattern from memory controller 602 during a series of WR gaps. The multiple copies of the test data pattern are sampled by sampling circuit 616 using the respective reference clock or strobe signals to produce multiple sampled test data patterns. Next, these sampled test data patterns are averaged to produce an averaged sampled test data pattern 606 which is temporarily buffered in buffer register 608 and is subsequently returned from memory device 604 to memory controller 602 within a subsequent WR gap. Note that the process for computing the average can involve using additional registers to accumulate results. Such techniques are well known in the art and hence will not be described further in this specification.

Referring again to FIG. 6A, note that after the sampled test data pattern 606 (which can include averaged data from multiple test data patterns and/or a single test data pattern) is received at interface circuitry 618 of memory controller 602, the receiver 620-1 within transceiver 620 is enabled (while the transmitter 620-0 is disabled) to drive the sampled test data pattern 606 to control logic 622. In this embodiment, control logic 622 has a copy of the original test data pattern, and is configured to compute the early/late phase information of the received sampled test data pattern 606.

In some embodiments, control logic 622 first compares each value in the sampled test data pattern with a corresponding value in the original test data pattern to determine the implications of the received data given what it knows about the transmitted data. Next, control logic 622 obtains the early/late information by determining if each of the originally phase-shifted transmitted data's sampled value matches the current bit in the test data pattern (or alternatively the previous bit or the next bit in the test data pattern). At this point, control logic 622 can proceed to determine a phase error between the write data and the reference clock or strobe signal based on the computed sampling phase early/late count by using the aforementioned techniques. Note that the above-described embodiments track phase errors by identifying matching bits between the data pattern and the sampled test data pattern on the memory controller.

FIG. 6B illustrates a variation on the embodiment of FIG. 6A, wherein comparison results are directly computed on a memory device 632. In this embodiment, memory controller 602 and memory device 632 use the same pattern generator (not shown in the figure) with the same seed or storage of an un-shifted portion of the data pattern to generate the same series of test data patterns for comparison. Moreover, in this embodiment, the aforementioned pattern generator on the memory device 632 may be triggered to generate a copy of the test data pattern whenever a new test data pattern is received.

More specifically, on the memory controller 602, all or a portion of the test data pattern 633 is phase-shifted by ½ UI in the above-described manner before being sent across data link 612 to memory device 632 within a WR gap. The received test data pattern 633 is then sampled to produce sampled test data pattern 634, which is subsequently buffered within a first buffer register 636. Note that because memory device 632 possesses a copy of the original test data pattern which is either generated by the aforementioned pattern generator or stored from the previous portion of the received test pattern, memory device 632 does not have to return sampled test data pattern 634 to memory controller 602 to compute the early/late information. Instead, in some embodiments memory device 632 uses a second buffer register 638 to hold the original test data pattern which was generated by the pattern generator on memory device 632. Next, a bit-by-bit early/late comparison can be performed between buffer register 636 and buffer register 638, and the early/late information can be accumulated in phase error counters 640. Finally, the contents in counters 640 containing phase movement information can be sent back to memory controller 602 during a subsequent available WR gap. In some embodiments, the early/late information can be generated in a more serial fashion without buffer registers 636 or 638 and can directly increment or decrement phase error counters 640. (In an alternative embodiment, memory device 632 does not have a pattern generator. Instead, memory controller 602 transmits the test pattern with normal timing for storage in memory device 632. Memory controller 602 then transmits the test pattern a second time with a phase offset for early/late detection in memory device 632.)

Note that the embodiment illustrated in FIG. 6B can also allow phase errors to be computed over multiple sampled test data patterns (which can be generated based on multiple copies of an identical test data pattern or multiple distinct test data patterns) to be accumulated in counters 640 and returned to memory controller 602 within a next available WR gap.

Also note that the above-described embodiments can track phase errors by sending regular data patterns from the memory controller to the memory device within WR gaps. Moreover, the phase tracking is performed only during the available WR gaps. FIG. 6C illustrates an embodiment which performs continuous phase tracking using regular write data without the need to use test data patterns. Note that this embodiment involves using a memory device 642 which includes two sampling circuits and a ½ UI phase element.

More specifically, memory device 642 includes a first sampling circuit 644 which samples an input data stream 646 according to a reference clock or strobe signal 648 to produce a first sampled data stream 650 at the output of sampling circuit 644. In particular, input data stream 646 is regular write data which is written to memory core 680. Additionally, memory device 642 includes a ½ UI phase element 652, such as a delay-line, or a portion of or an entire phase-locked loop (PLL) or delay-locked loop (DLL). In this embodiment, ½ UI phase element 652 is configured to delay the clock or strobe signal 648 to cause an approximately ½ UI phase shift when the data is sampled at a second sampling circuit 656 to produce a second sampled data stream 658 at the output of sampling circuit 656. Note that sampled data streams 650 and 658 correspond to the sampled test data pattern and the original test data pattern in the embodiments illustrated in FIGS. 6A and 6B. Hence, phase detection logic 660 may be used to compare sampled data streams 650 and 658 to generate phase error information. Note that phase detection logic 660 can be implemented similarly to the comparison result generation mechanism described in FIG. 6B. Next, the phase error information can be sent back to memory controller 602 during a next available WR gap. Phase detection logic may operate on sampled write data in stream 646 sent from memory controller 602 to memory device 642, or on an arbitrary test data pattern embedded in stream 646 during a WR gap.

Note that the embodiment illustrated in FIG. 6C facilitates performing continuous and real-time phase tracking and calibration on regular write data streams, thereby removing the need to send the test data patterns during the WR gaps. Furthermore, the phase error information which is sent back on the WR gaps can occupy the entire WR gap. One tradeoff in using this technique is that an additional edge sampler is required on the memory device as well as the need to generate a clock which is offset ½ UI from the ideal sample point.

Note that although the present technique is described in terms of clock-data synchronization between a memory controller and memory device, the present technique is not meant to be limited to calibrating communications between memory controllers and memory devices. In general, the present technique can be applied to clock-data synchronization between a pair of memory controllers, between a pair of processors, and/or between a memory controller and a processor. More generally, the present technique can be applied to clock-data synchronization between any transmitter and any receiver system coupled via a bidirectional link, and requiring a time gap during a transmission turnaround between the transmitter and the receiver.

Note that because the above-described clock-data synchronization technique is applicable to source-synchronous communication within a computer memory, this technique can be used in any system that includes a source-synchronous dynamic random access memory device (DRAM). The technique can also be applied to other clock architectures, such as multiple forms of PLL or DLL based mesochronous or plesiochronous links. Hence, the described technique can be applied to a system which includes, but is not limited to, a mobile system, a desktop computer, a server, and/or a graphics application. Moreover, the techniques described may be applicable to other types of memory, for example flash and other types of non-volatile memory, as well as volatile static random access memory (SRAM). Additionally, one or more of the techniques described herein are applicable to a front side bus (i.e., processor-to-bridge chip, processor to processor, and/or other types of chip-to-chip interfaces). Note that the two communicating integrated circuit IC chips (i.e., the transmitter and receiver) can also be housed in the same package, e.g., in a stacked die approach. Furthermore, the transmitter, the receiver and the channel can all be built on the same die in a system-on-a-chip (SOC) configuration.

Moreover, it should be understood that a clock signal in the context of the instant description may be embodied as a strobe signal or other signal that conveys a timing reference and is not limited to a signal that is strictly periodic. For example, the clock signal may be a strobe signal that is aperiodic in the sense that transitions only occur when data is being transmitted. In general, the clock signal may be any type of signal that conveys timing information (e.g., temporal information that indicates that associated data is valid).

Using the WR Gap as a Back Channel

Figure 7A:
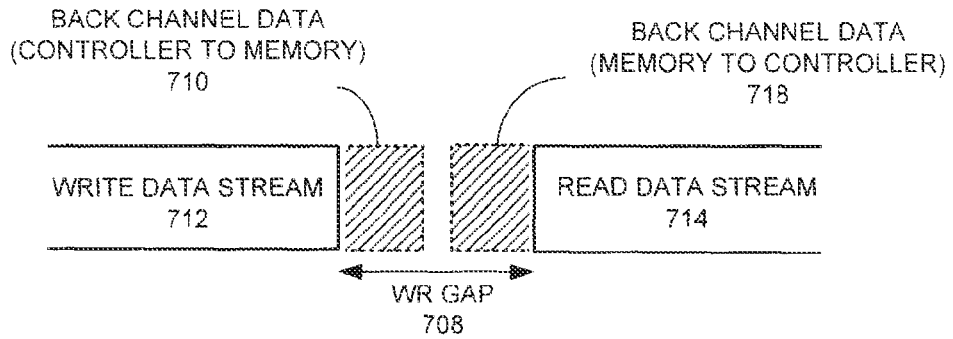
FIG. 7A illustrates a WR gap which is used as a "back channel" to send data between a memory controller and a memory device.

A WR gap can generally be used to communicate any type of data between a memory controller and a memory device. For example, FIG. 7A illustrates a WR gap 708 which is used as a "back channel" to send data between a memory controller and a memory device. Note that a first portion 710 of WR gap 708, which immediately follows write data stream 712, can be used as a back channel (or sideband) to communicate data from the memory controller to the memory device. After the write-to-read turnaround completes in the memory core, a second portion 718 of the WR gap 708, which immediately precedes read data stream 714, can be used as a back channel to communicate data in the other direction, from the memory to the memory controller.

Figure 7B:
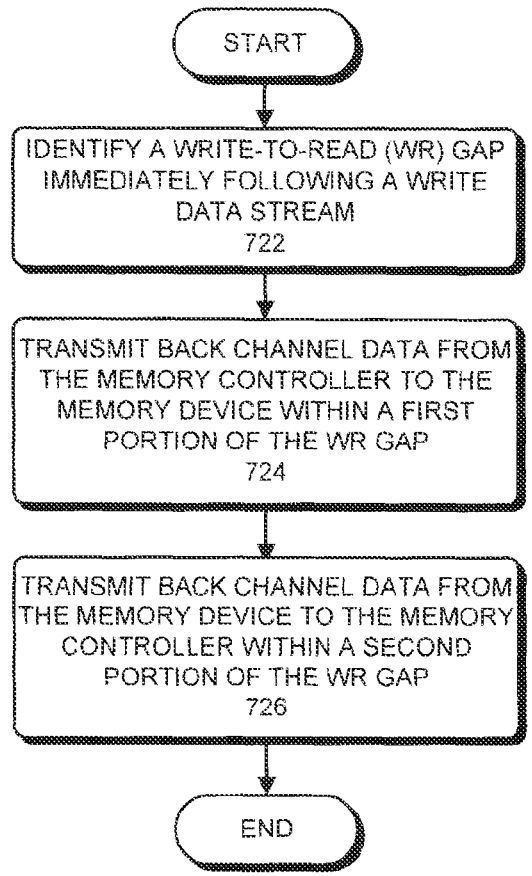
FIG. 7B presents a flowchart illustrating a process that uses a WR gap as a "back channel" to send data between a memory controller and a memory device.

Referring to FIG. 7B, during operation, the system first identifies a WR gap immediately following receipt of write data and before a subsequent transmission of read data (step 722). Note that this WR gap can be identified by the memory controller based on a received memory command sequence. Next, the system transmits back channel data from the memory controller to the memory device within the first portion 710 of the WR gap 708 (step 724). The system can subsequently transmit back channel data from the memory device back to the memory controller within the second portion 718 of the WR gap 708 (step 726). Note that this back channel data can generally include any type of data. For example, it can include data which facilitates error correction and detection for either read data or write data.

Using the Write-to-Idle Gap as a Back Channel

Figure 7C:
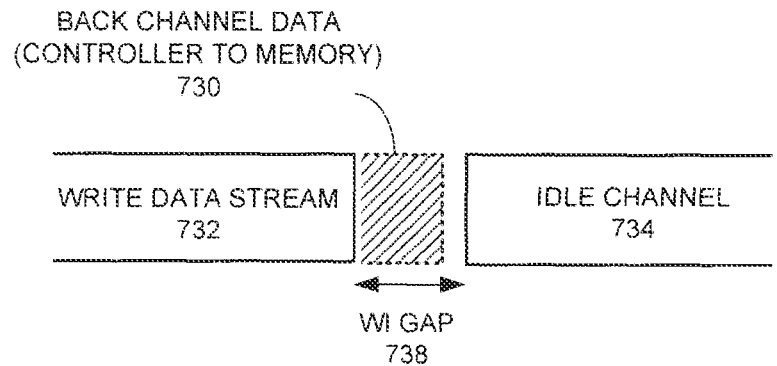
FIG. 7C illustrates a write-to-idle (WI) gap which is used as a "back channel" to send data from a memory controller to a memory device.

Note that a similar time gap occurs during transitions from writing data from the memory controller to the memory device to an idle state, during which communications between the memory controller and the memory device are idle. This write-to-idle time gap can similarly be used as a back channel to communicate data from the memory controller to the memory device. For example, FIG. 7C illustrates a WI gap 738 which can be used as a "back channel" to send data from a memory controller to a memory device. As illustrated in FIG. 7C, a portion 730 of WR gap 738, which immediately follows write data stream 732, can be used as a back channel to communicate data from the memory controller to the memory device. After the write-to-idle transition completes in the memory core, the channel between the memory controller and the memory device becomes idle 734.

Figure 7D:
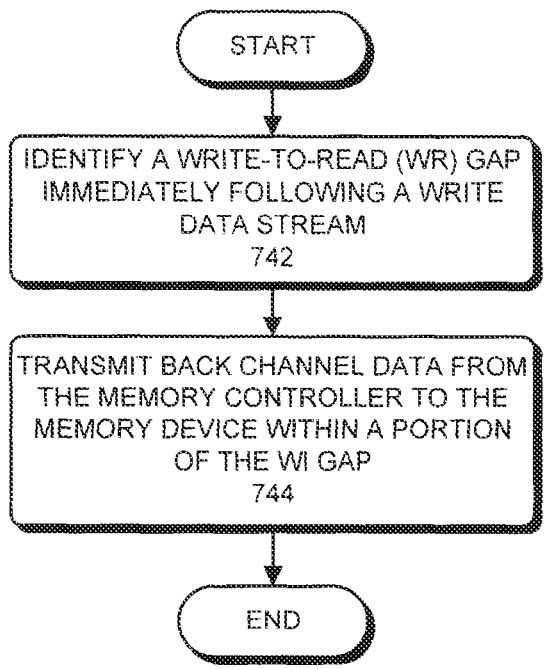
FIG. 7D presents a flowchart illustrating a process that uses a WI gap as a "back channel" to send data from a memory controller to a memory device.

Referring to FIG. 7D, during this process, the system first identifies a WI gap immediately following receipt of write data and before a subsequent idle state for the communication channel (step 742). Note that this WI gap can be identified by the memory controller based on a received memory command sequence. The system can then transmit back channel data from the memory controller to the memory device within a portion 730 of the WI gap (step 744).

Using the WR Gap to Echo a Test Data Pattern Back to the Controller

In some embodiments, at the end of a write operation but before a subsequent read operation in a read-write sequence, the memory device can take the data stream it receives, and after turning the bus around, can echo the received data stream back the controller. Such a scheme can be easily implemented by making minor modifications to existing circuitry to the memory device. In fact, in some cases this can be accomplished by simply using the existing I/O pipeline circuitry. (This scheme can be viewed as an embodiment of the previously described phase tracking scheme, wherein the WR gap is used to carry more general types of data.)

Figure 8A:
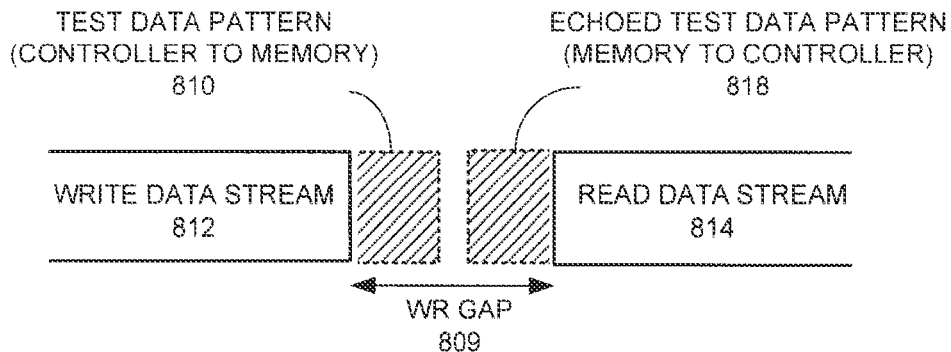
FIG. 8A illustrates a WR gap which is used to send a test data pattern from a memory controller to a memory device and to return a corresponding echoed test data pattern from the memory device to the memory controller.

More specifically, FIG. 8A illustrates how a WR gap can be used to send a test data pattern from a memory controller to a memory device and to return an echoed test data pattern from the memory device to the memory controller. Note that a first portion 810 of WR gap 809, which immediately follows write data stream 812, can be used to communicate a test data pattern 810 from the memory controller to the memory device. After the test data write pattern a second portion 818 of the WR gap 809, which immediately precedes read data stream 814, can be used to communicate the echoed test data pattern in the other direction, from the memory to the memory controller.

Figure 8B:
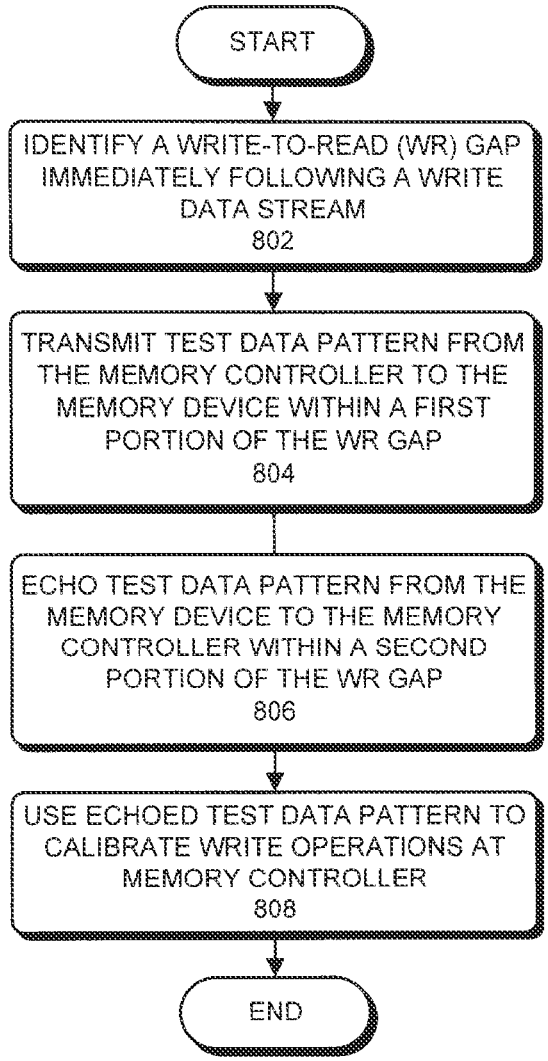
FIG. 8B presents a flowchart illustrating a process that uses a WR gap to send a test data pattern from a memory controller to a memory device and to return a corresponding echoed test data pattern from the memory device to the memory controller.

Referring to FIG. 8B, during this process, the system first identifies a WR gap immediately following receipt of write data and before a subsequent transmission of read data (step 802). Note that this WR gap can be identified based on a received memory command sequence by the memory controller.

Next, the system transmits a test data pattern from the memory controller to the memory device within a first portion 810 of the WR gap 809 (step 804). After the write-to-read turnaround, the system can echo the test data pattern from the memory device back to the memory controller within the second portion 818 of the WR gap 809 (step 806). The memory controller can then use the echoed test data pattern to calibrate the write operation (step 808).

Figure 9:
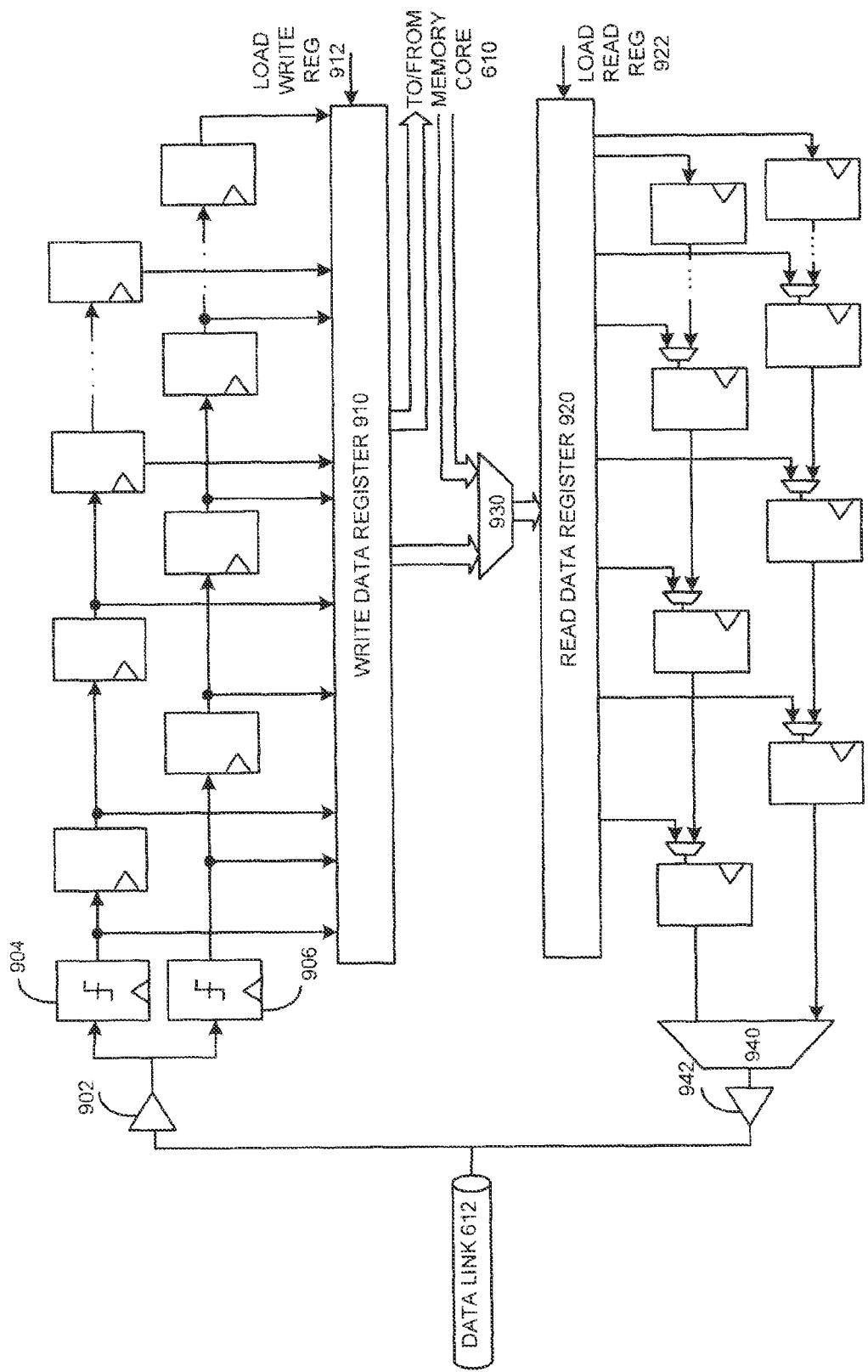
FIG. 9 illustrates circuitry on a memory device which facilitates echoing a test data pattern back to a memory controller during a WR gap.

FIG. 9 illustrates circuitry on a memory device which echoes a test data pattern back to a memory controller during a WR gap. The top portion of FIG. 9 illustrates a set of flip-flops which comprise a deserializer circuit which converts a serial data stream from data link 612 into a parallel data word which is loaded into a write data register 910. This write data word then feeds into the memory core 610, or alternatively passes through multiplexer 510 directly into read register 920 to be echoed back to the memory controller across data link 612.

Read data register 920 can receive a dataword directly from write data register 910, or alternatively from memory core 610. A dataword from read data register 920 feeds through a set of flip-flops in the bottom portion of FIG. 9 which comprises a serializer. This serializer converts the dataword into a serial data stream which feeds across data link 612 back to the memory controller. (Note that before a dataword is echoed back to the memory controller, some additional delay can be included to allow time for bus turn-around.)

Figure 10:
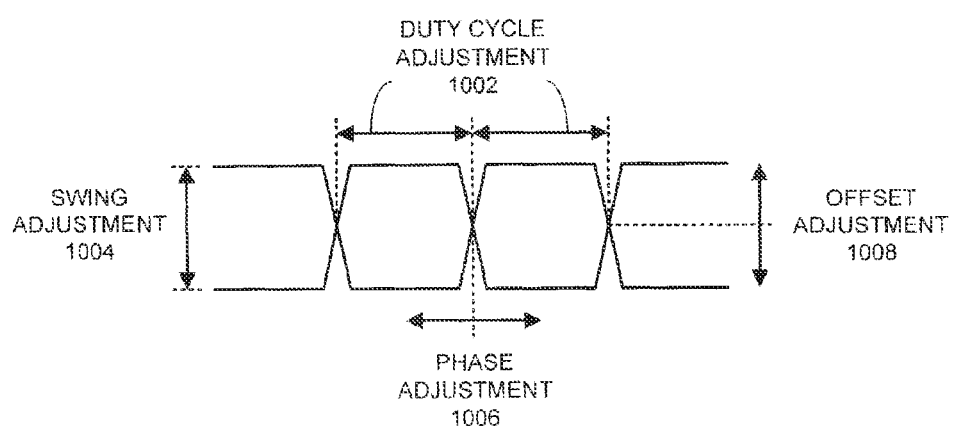
FIG. 10 illustrates a number of possible calibration adjustments.

While such modifications involve very little additional complexity on the memory device, they enable a large set of calibration/adaptation operations to be performed on the controller side. For example, FIG. 10 illustrates a number of possible calibration adjustments. These adjustments can include one or more of the following: (1) adjusting a phase relationship between the data signal and the timing signal 1006; (2) adjusting an offset voltage for the data signal and/or the timing signal 1008; (3) adjusting a voltage swing for the data signal and/or the timing signal 1004; (4) adjusting a duty cycle for the data signal and/or the timing signal 1002; (5) adjusting one or more equalization coefficients for the data signal and/or the timing signal; and (6) performing shmooing operations to calibrate relative timing between the data signal and the timing signal. There are a number of well-known techniques to perform such calibration adjustments once calibration data is available on the memory controller.

Given the inherently symmetric nature of the bidirectional channel, one skilled in the art can easily envision applications of the various calibration information on both the memory device and the controller for both writes as well as reads as data flowing in either direction will frequently experience the same channel phenomena.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for calibrating timing for write operations between a memory controller and a memory device, the method comprising:
   identifying a time gap required to transition from writing data from the memory controller to the memory device to reading data from the memory device to the memory controller;
   transmitting a data signal containing a test data pattern from the memory controller to the memory device within the time gap;
   using a timing signal to receive the test data pattern at the memory device; and
   using the received test data pattern to calibrate a phase relationship between the data signal and the timing signal during write operations.

2. The method of claim 1, wherein using the timing signal to receive the test data pattern involves sampling the test data pattern using the timing signal to produce a sampled version of the test data pattern.

3. The method of claim 2, wherein a phase relationship between the timing signal and the test data pattern is offset by approximately one-half of a symbol time with respect to a phase relationship between the timing signal and a regular write data pattern.

4. The method of claim 2, wherein using the received test data pattern to calibrate the phase relationship between the data signal and the timing signal involves:
   returning the sampled version of the test data pattern from the memory device to the memory controller; and
   calibrating the phase relationship between the data signal and the timing signal based on the sampled version of the test data pattern received at the memory controller.

5. The method of claim 4, wherein calibrating the phase relationship between the data signal and the timing signal involves computing a phase error indicator based on the sampled version of the test data pattern, wherein the phase error indicator indicates if the data is early or late with respect to the timing signal, wherein computing the phase error involves:
   comparing a value in the sampled version of the test data pattern with a corresponding preceding value and a corresponding succeeding value in the test data pattern to determine first and second comparison results; and
   computing a phase error indicator based on the first and second comparison results.

6. The method of claim 4, wherein returning the sampled version of the test data pattern from the memory device to the memory controller involves returning the sampled version of the test data pattern within the same time gap which was used to transmit the test data pattern.

7. The method of claim 4, wherein returning the sampled version of the test data pattern from the memory device to the memory controller involves returning the sampled version of the test data pattern within a subsequent time gap following the one which was used to transmit the test data pattern.

8. The method of claim 1, wherein the method further comprises:
   receiving multiple copies of the test data pattern from the memory controller at the memory device over a number of time gaps;
   at the memory device, sampling the multiple copies of the received test data pattern using the timing signal to produce multiple sampled versions of the test data patterns;
   averaging the multiple sampled versions of the test data patterns to produce an averaged sampled version of the test data pattern;
   returning the averaged sampled version of the test data pattern from the memory device to the memory controller;
   receiving the averaged sampled version of the test data pattern at the memory controller;
   computing a phase error indicator based on the averaged sampled version of the test data pattern, wherein the phase error indicator indicates if the data is early or late with respect to the timing signal; and
   calibrating the phase relationship between the data signal and the timing signal transmitted from the memory controller to the memory device based on the phase error indicator.

9. The method of claim 8, wherein returning the averaged sampled version of the test data pattern from the memory device to the memory controller involves returning the averaged sampled version of the test data pattern within a subsequent time gap required to transition from a writing operation to a read operation.

10. A system that calibrates timing for write operations between a memory controller and a memory device, comprising:
- the memory controller;
- the memory device;
- wherein the memory controller is configured to transmit a data signal containing a test data pattern from the memory controller to the memory device within a time gap required to transition from writing data from the memory controller to the memory device to reading data from the memory device to the memory controller;
- receiving circuitry on the memory device configured to use a timing signal to receive the test data pattern at the memory device; and
- calibration circuitry on the memory device configured to use the received test data pattern to calibrate a phase relationship between the data signal and the timing signal.

11. The system of claim 10, wherein the receiving circuitry on the memory device includes an edge sampler configured to sample the test data pattern using the timing signal to produce a sampled version of the test data pattern.

12. The system of claim 11, further comprising:
- loopback circuitry on the memory device configured to return the sampled version of the test data pattern from the memory device to the memory controller; and
- calibration circuitry on the memory controller configured to calibrate the phase relationship between the data signal and the timing signal based on the sampled version of the test data pattern.

13. The system of claim 12, wherein the calibration circuitry includes computing circuitry to compute a phase error indicator based on the sampled version of the test data pattern, wherein the phase error indicator indicates if the data is early or late with respect to the timing signal, wherein the computing circuitry is configured to compute the phase error indicator by:
- comparing a value in the sampled version of the test data pattern with a corresponding preceding value and a corresponding succeeding value in the test data pattern to determine first and second comparison results; and
- computing a phase error indicator based on the first and second comparison results.

14. The system of claim 12, wherein the loopback circuitry on the memory device is configured to return the sampled version of the test data pattern within the same time gap which was used to transmit the test data pattern.

15. The system of claim 12, wherein the loopback circuitry on the memory device is configured to return the sampled version of the test data pattern within a subsequent time gap following the one which was used to transmit the test data pattern.

16. The system of claim 10 wherein a phase relationship between the timing signal and the test data pattern is offset by approximately one-half of a bit time with respect to a phase relationship between the timing signal and a regular write data pattern.

17. The system of claim 10,
- wherein the memory device is further configured to:
  - receive multiple copies of a test data pattern from the memory controller at the memory device over a number of time gaps;
  - sample the multiple copies of the received test data pattern using the timing signal to produce multiple sampled versions of the test data patterns;
  - average the multiple sampled versions of the test data patterns to produce an averaged sampled version of the test data pattern; and
  - return the averaged sampled version of the test data pattern from the memory device to the memory controller; and
- wherein the memory controller is further configured to:
  - receive the averaged sampled version of the test data pattern at the memory controller;
  - compute a phase error indicator based on the averaged sampled version of the test data pattern, wherein the phase error indicator indicates if the data is early or late with respect to the timing signal; and
  - calibrate the phase relationship between the timing signal and the data transmitted from the memory controller to the memory device based on the phase error indicator.

18. The system of claim 17, wherein the memory device returns the averaged sampled version of the test data pattern to the memory controller within a subsequent time gap required to transition from a writing operation to a read operation.

* * * * *